United States Patent [19]

Wingerd et al.

[11] 4,169,160

[45] Sep. 25, 1979

[54] DRIED SOFT CURD CHEESE

[75] Inventors: Winston H. Wingerd, Camillus; Carlton K. Bergsbaken, Syracuse, both of N.Y.

[73] Assignee: Borden, Inc., Columbus, Ohio

[21] Appl. No.: 918,585

[22] Filed: Jun. 23, 1978

Related U.S. Application Data

[63] Continuation of Ser. No. 549,726, Feb. 13, 1975, abandoned.

[51] Int. Cl.$^2$ ............... A23C 19/02; A23C 19/14
[52] U.S. Cl. ............................ 426/40; 426/582; 426/471; 426/522
[58] Field of Search ............... 426/36, 40, 582, 583, 426/522, 471

[56] References Cited

U.S. PATENT DOCUMENTS

| | | | |
|---|---|---|---|
| 2,956,885 | 10/1960 | Roundy et al. | 426/582 |
| 3,023,104 | 2/1962 | Battista | 426/582 X |
| 3,076,709 | 2/1963 | Rivoche | 426/582 X |
| 3,316,098 | 4/1967 | Noznick et al. | 426/582 X |
| 3,792,178 | 2/1974 | Noznick et al. | 426/583 X |

OTHER PUBLICATIONS

Merck Index, An Encyclopedia of Chemicals and Drugs, 8th Edition, 1968 (pp. 220 and 221).

Primary Examiner—David M. Naff
Attorney, Agent, or Firm—George A. Kap; George P. Maskas; Daniel D. Mast

[57] ABSTRACT

Alpha cellulose powder is used in the manufacture of dried soft curd cheese, such as bakers cheese or cottage cheese, to increase its texture and water-binding capacity.

4 Claims, No Drawings

DRIED SOFT CURD CHEESE

This is a continuation, of application Ser. No. 549,726, filed Feb. 13, 1975, now abandoned.

This invention relates to a dried soft curd cheese and method of its preparation which is characterized by the use of micropulverized alpha cellulose to improve texture of the reconstituted cheese as well as to increase its gel strength and its water-binding capacity. More specifically, the invention relates to a process of making dried soft curd cheese which includes the steps of condensing, pasteurizing and coagulating milk, the improvement comprising the step of adding alpha cellulose powder in an amount of 0.5 to 10% by weight of the dried cheese. Dried soft curd cheese is in the form of a substantially dry powder. Examples of such cheese include bakers cheese, cottage cheese, pot cheese, farmers cheese and Neufchatel cheese.

The main object of this invention is to increase water-binding capacity of the dried soft curd cheese so that it can bind more water than when the dried cheese is made without alpha cellulose powder. Increase in water-binding capacity of the dried cheese is accompanied by improvement in the texture thereof when reconstituted with milk or water which is of vital importance for commercial acceptability of the product.

Because of its biological constitution, disposition of whey presents problems especially in view of the recent regulations by various localities which either prohibit outright disposition of whey into sewers and rivers or impose a tax on the privilege of dumping it into sewers. By retaining the whey solids in the cheese and disposing of water as steam when the cheese composition is spray dried, as is taught by this disclosure, not only is the problem of its disposal eliminated but also the resulting product is enriched because of the nutritious character of whey solids.

Liquid whey contains 5% lactose, 0.5% whey protein, 0.8% ash, 0.1 to 0.2% non-protein nitrogen and remainder water. Whey protein is a very high quality protein which has a biological availability factor of 100 which is used as a reference point for all other proteins most all of which have a ba factor of less than 100.

In the conventional manufacture of a soft curd cheese, cow's skim milk or whole milk is treated with additives to make a coagulable mix which sets at a low temperature in a period of 18 to 30 hours. At the end of the setting period, the mix is fully coagulated and the curd may settle to the bottom or float on the surface, depending upon amount of gassing or aeration of the curd. The coagulated mix is stirred and then placed in bags for drainage of whey for a period of 24 to 48 hours. Drainage is facilitated by application of pressure and by packing the bags in ice or storing them in a cooler. After drainage, the curd is in the form of a heavy paste having a total solids concentration of 18 to 26% by weight, on dry basis.

The main objections to the conventional procedure are the prolonged time required for operation, the labor and material expense involved, the various handling operations which may result in contamination of the cheese and the loss of cheese adhering to the bags or through breaking of the bags during handling. The long processing periods also require a substantial inventory and plant storage for the curd.

In another conventional process, the bagging operation is not used but the cheese mix is set in an open vat and treated with sufficient additives to complete the set in about 6 to 8 hours. After setting, the coagulated mix is cut with a rake and the whey drained. Here again, the processing time is considerable and the same objections apply with respect to labor, possible loss of cheese and poor keeping qualities.

The conventional methods of preparing soft curd cheeses represent a gradual development of years of practice with the object of controlling the final titratable acidity of the cheese and enabling the whey to drain from bags or vats to produce a cheese with total solids of about 25%. Procedure utilized to make the cheese must also assure that the cheese will not be too granular and will have a pleasant flavor, all of which require careful process control. Such control is obtained to a substantial degree by means of additives which require long periods of setting to cause a very gradual change in the milk so that it can be kept in bags or vats for a day or two without adversely affecting the product. Among such additives are starters such as curdled milk precipitated by means of strictly controlled bacteria. The function of a starter is to accelerate formation of lactic acid by the bacterial action and is added to the milk in varying amounts depending on the type of cheese to be made. For instance, amount of starter varies from 2 to 5% for bakers cheese. Another additive is rennet which is an extract from calve's stomachs. A third additive, which is used only occasionally, is calcium chloride, which is used to reduce setting period and to replace natural calcium chloride in the milk which is either precipitated or rendered less active by rennet or pasteurization.

Rennet furnishes pepsins and enzymes of controlled quality to replace those present in raw milk which are destroyed by pasteurization. In some instances, addition of rennet is omitted and the action is obtained from the starter and additional heat. As little as one part of rennet in 8000 parts of milk will cause coagulation. It is customary, though, to add 1 cc of rennet per 80 to 1000 pounds of milk.

The additives contribute to coagulation of milk in the desired length of time, eliminate erratic behavior of the set, protect against self-inoculation of the milk from impurities in the dairy and contribute to desired formation of cheese particles.

The Roundy et al U.S. Pat. No. 2,956,885 describes a more recent process for making dried bakers-type cheese wherein fermentation and the accompanying use of starter cultures and rennet is eliminated. In preparation of bakers cheese pursuant to the Roundy et al patent, substantially all butterfat is removed and the resulting skim milk is optionally pasteurized to improve its flavor and keeping qualities. This skim milk is condensed to a solids content of up to 40% and heated during its condensation in the hot well to destroy viable organisms and to inactivate enzymes which may be present in the milk.

Instead of using rennet and/or starting culture, Roundy et al acidify the milk to a pH of 4.0 to 4.9, preferably 4.5 to 4.7, while maintaining temperature thereof at 35° to 135° F., preferably at 40° to 60° F. Acidification is accomplished by addition to the skim milk of about 0.3 to 0.4% by weight of an edible acid dissolved in water while agitating the skim milk. Precipitation of the curd is accomplished in a very short time as soon as the mixture is completely and uniformly acidified. The precipitated mixture is then dehydrated by any suitable means such as conventional spray drying equipment having a nozzle orifice of about 0.02 to 0.04 inch in diameter. Inlet temperature in the spray dryer is in excess of 212° F., preferably 250° F., and the outlet temperature is within the range of 138° to 155° F. The dried bakers cheese, which is in powder form, has a moisture content of about 3%. Freeze drying and roller drying can also be used to dehydrate precipitated or coagulated mixture.

At bottom of column 3 of the Roundy et al patent, it is noted that the bakers-type cheese product can be improved in its baking characteristics when either natural or synthetic stabilizers are added thereto. The three best stabilizers mentioned are carboxymethyl cellulose, locust bean gum and instant starch. Especially suitable is a mixture of 3.3% carboxymethyl cellulose and 6.7% instant starch, resulting in the final cheese product which contains about 10% stabilizers.

Unlike the process described in the Roundy et al U.S. Pat. No. 2,956,885, our process relies on fermentation of milk by means of a starter culture and rennet. In making bakers cheese, skim milk is heated to a temperature of 165° to 195° F. and held in the hot well in that range for about 5 to 30 minutes. This heat treatment can also be accomplished at a temperature of 280° to 300° F. in about 30 seconds, or at other extrapolated temperature and duration. After this initial heat treatment, protein nitrogen should be 2.0 milligrams or less per gram of non-fat milk solids, whether the milk is whole or skim milk.

The heat treatment of milk is important to maximize water-holding capacity of the cheese. The milk is heated sufficiently to promote the reaction between whey protein and casein. The reaction between whey protein and casein forms complexes which have water-binding capacity up to 10 times that of the reactants.

Following heat treatment, the skim milk is condensed to a solids proportion of 8 to 30% total solids and cooled to about 45° F. Condensation is accomplished in a conventional manner at a temperature of 120° to 130° F. Following condensation, the milk is held in a quiescent state at a preferred temperature of 40° to 50° F. for a period in excess of about 6 hours. Higher or lower temperatures can be used but care must be exercised to maintain bacterial plate count at an acceptable level of less than about 5000 colonies per gram of milk solids.

Condensed skim milk is pasteurized in any suitable manner, preferably through a high temperature short time unit at 162° to 170° F. for 16 to 25 seconds. It is then cooled to 90° F. and pumped to a cheese vat. Sodium citrate is mixed with warm water and the mixture is added to the vat accompanied by good agitation to enhance flavor of the product. With continued agitation, starter and rennet are added. Amount of starter will depend on type of starter used and the particular cheese produced. For bakers cheese, however, amount of starter will be in the range of 1 to 20% by weight of total milk solids in the condensed milk. Amount of starter varies inversely with the time it takes to achieve the desired character. It should be understood that more or less starter could be used and the time would be either lessened or lengthened. Amounts given here are merely given as a general guide. At 1% of starter, it may take 20 hours to achieve the desired end whereas at 10%, it will take only about 5 hours and even quicker at 20%. The starter is changed frequently to avoid formation of bacteriophage.

Rennet is a very powerful reagent. It is a proteolitic enzyme which curdles casein. As little as one part of rennet 100, a standardized solution of rennet, in 8000 parts of liquid skim milk will cause coagulation. In making bakers cheese, the normal practice involves addition of 1 cc of rennet 100 per 10 to 125 pounds of milk solids. The mixture is then heated to a temperature in the range of 60° to 120° F., preferably 90° F., the agitators turned off and the mixture allowed to incubate.

After titratable acidity of the incubated mixture reaches from 1.0 to 1.6, preferably 1.35, hydroxypropyl cellulose or methyl cellulose in a solution of hot water is added in an amount of 0.1 to 0.5% on dry weight of the final spray dried product followed by alpha cellulose powder which is added in an amount of 0.5 to 10% by weight of the dried soft curd cheese. Addition of alpha cellulose powder is made by sprinkling it on top of the mixture in the vat while continuing with high agitation which develops a vortex.

After complete mixing, the slurry is homogenized by passing it through a homogenizer at a pressure of 500 to 2500 pounds. The slurry is then dried in a spray drier having a 0.060 inch orifice with inlet temperature of 400° to 450° F., and outlet temperature of 180° to 200° F. It is desired to have a product with a maximum moisture of about 4.5%.

Suitable micropulverized alpha cellulose is Avicel-PH-101 microcrystalline cellulose made by FMC as well as other analogous powders falling in this group. Avicel-PH-101 is a white, odorless, nonfibrous, free-flowing powder containing only trace amounts of organic solvents and dilute acids. It is insoluble in water, organic solvents and dilute acids. It is partially soluble in dilute alkali. It is believed that the property of insolubility and the very fine particle size render alpha cellulose powder suitable for imparting water-binding property to the cheese. The vast surface area of the powder probably binds a film of water which suggests that the finer the particle size of the powder, the higher will be its water-binding capacity. Experimentation has confirmed this premise.

Avicel-PH-101 microcrystalline cellulose powder has less than about 5% loss or drying, less than 10 ppm of heavy metals, less than 250 ppm residue on ignition, less than 8 mg/5 g of water soluble substances. Its pH is in the range of 5.5 to 7.0, its average particle size is 30 microns and its particle size distribution is as follows:

less than 1% retained on 60 mesh screen
less than 30% retained on 200 mesh screen Avicel-PH-105 is also a spray dried powder of specially refined form of alpha cellulose which has an average particle size of 18 to 20 microns with less than 1% retained on a 400 mesh screen.

Avicel-PH-102 is another spray dried powder of alpha cellulose but its average particle size is 140 microns, considerably larger than other powders.

The terms "powder," "micropulverized" or "microcrystalline," as used herein, shall indicate particle size on the order of the Avicel-PH-101 powder and others given above. The term "dried soft curd cheese" shall define a dried cheese having a soft curd when reconstituted, such as that of bakers cheese, cottage cheese, etc. As used herein, the term "milk" shall include cow's milk, goat's milk, mare's milk, etc.

The following examples illustrate the invention described herein as it relates to production of bakers cheese and subsequent use of such cheese in a cheese cake.

EXAMPLE 1

The bakers cheese formulation included the following materials in pounds by weight:

| | |
|---|---|
| skim milk containing 22% solids | 4653.00 (dry) |
| cultured skim milk containing 12% solids | 517.00 (dry) |
| sodium citrate duohydrate | 41.25 |
| micropulverized alpha cellulose (Avicel-PH-101) | 275.00 |
| hydroxypropyl cellulose (Klucel LF) | 13.75 |
| rennet | 240cc |
| | 5500.00 |

The skim milk was heated to about 180° F. and held for about 30 minutes in a hot well until whey protein nitrogen was less than 2.0 milligrams per gram of nonfat milk solids. It was then condensed to 30% total solids. Condensation was carried out in 60 minutes at 120° to 130° F. in a vacuum pan at about 27 inches of vacuum. Should it be necessary to hold the condensed skim milk for a day or longer, it should be cooled to about 45° F. or lower to maintain its keeping quality. It was thus maintained at about 45° F. in a quiescent state for a period of 10 hours to maximize the water-binding capacity of the final spray dried product.

The condensed milk was pasteurized in a high temperature short time unit at about 165° F. which took about 20 seconds, cooled to about 90° F. and pumped to a cheese vat. Sodium citrate was mixed in 30 gallons of warm water and added to the vat with good agitation. With continued agitation, the cultured skim milk starter was added in amount of 10% of total milk solids. The starter included 2 parts by weight of H-188 (made by Chas. Hansen's Laboratory, Milwaukee, Wis.) and 1 part by weight of H-73 (made by the same company). Any other good multiple strain starter can be used. H-188 is diacetyl lactis and H-73 is a multiple strain starter containing a mixture of lactic acid-forming organisms. After adding the starter, rennet was added in 2 gallons of cold water accompanied with good agitation. Agitation was continued for about 10 minutes while heating the slurry to about 90° F. and then discontinued and allowed the slurry to incubate. The slurry contained about 22% total solids.

After titratable acidity of the slurry reached 1.35, which took about 3 hours after incubation, Klucel LF powder in 30 gallons of 140° F. water and Avicel-PH-101 were added. In the case of the Avicel powder, it was sprinkled on top of the slurry in the vat. Agitation was continued until complete dispersion of Klucel and Avicel was achieved, which took about 15 minutes.

After completing mixing, the slurry was pumped to a smaller vat with a pair of lightening agitators to keep Avicel from settling out and then homogenized at 1500 pounds and spray dried. The orifice in the spray drier was 0.060 inch, and inlet and outlet temperatures were 430° and 190° F., respectively.

The product was a free-flowing white powder containing 3% moisture. Composition of the product in weight percent on dry basis was as follows:

| | |
|---|---|
| skim milk solids | 94.00 |
| sodium citrate | 0.75 |
| alpha cellulose (Avicel-PH-101) | 5.00 |
| hydroxypropyl cellulose (Klucel LF) | 0.25 |
| | 100.00 |

EXAMPLE 2

This example illustrates the use of dried bakers cheese prepared in Example 1 in making a refrigerated cheese cake.

Into a small mixing bowl was added 336 grams of milk and 200 grams of a bakers cheese formulation was blended in at a blending speed for 1 minute. The bakers cheese formulation had the following composition in percent by weight:

| | |
|---|---|
| sucrose | 29.5 |
| bakers cheese of Ex. 1 | 20.0 |
| dextrose | 12.7 |
| powdered shortening | 17.5 |
| buttermilk powder | 12.5 |
| pregelalized starch (Staley's Redisol 313) | 3.3 |
| tetrasodium pyrophosphate | 2.0 |
| monocalcium phosphate | 1.5 |
| lemon juice powder | 0.5 |
| salt | 0.1 |

The slurry was whipped at a whipping speed for 3 minutes, placed in an 8-inch pie pan and refrigerated for one hour. The cheese cake had more body than a pudding, some grains like in cottage cheese and cut clean without collapsing.

In addition to improving water-binding capacity and the texture of soft curd cheese, addition of microcrystalline cellulose also improves the gel strength thereof. Data has shown that addition of from about 1 to about 5% of microcrystalline alpha cellulose (Avicel-PH-101), on dry basis of the final product, increased the gel strength up to 20%. This property also contributes to the desired characteristics of the soft curd cheeses.

The dried soft curd cheese product should have a maximum of about 5% acid measured as lactic acid and a maximum moisture of about 4.5%. To test if the product has the desired water-absorbing capacity, 2 parts by weight of water and 1 part by weight of dried soft curd cheese, such as bakers cheese, are mixed in a beaker and then allowed to stand for 5 minutes. If the product has sufficient water-binding capacity, the contents of the beaker will not run out when it is laid on its side. It has been estimated that addition of micronized alpha cellulose and the processing steps described herein have doubled the water-binding capacity of the spray dried bakers cheese.

When bakers cheese is prepared conventionally, about 75% of the whey formed is drained and discarded. The discarded whey is equivalent to about 50% of solids in skim milk powder. These figures alone show that the present invention reduces substantially the cost of products which use milk or skim milk powder since the whey solids are retained and not drained off with the whey. In the case of bakers cheese prepared by the invention described here, the increase in weight of the product resulting from retention of the whey solids amounts to about 100%.

What we claim is:

1. The process for making dried soft curd cheese from milk having improved texture, gel strength and water-binding capacity comprising heat treating milk at a temperature selected from the group consisting of 165° to 195° F. for a period of 5 to 30 minutes and from 280° to 300° F. for about 30 seconds to promote reaction between whey protein and casein in order to maximize water-binding capacity of the dried cheese, condensing the milk, maintaining milk in a quiescent state for a period in excess of 6 hours, coagulating the condensed milk by adding a starter in amount of 1 to 20% by weight of milk solids and rennet in amount of 1 cc of rennet 100 per 10 to 125 pounds of milk solids in the condensed milk and incubating milk for a period of about 3 hours, adding alpha cellulose to the coagulated milk in amount of 0.5 to 10% based on the weight of dried cheese after titratable acidity of the coagulated milk reaches a value within the range of about 1.0 to 1.6, homogenizing and drying the coagulated milk.

2. Process of claim 1 wherein the milk is cow's milk and the heat treating step is continued until protein nitrogen is 2.0 milligrams or less per gram of non-fat milk solids in the milk, the process further including the step of homogenizing the coagulated milk following addition of alpha cellulose and the step of adding a gum selected from the group consisting of hydroxypropyl cellulose, methyl cellulose and mixtures thereof in amount of 0.1 to 0.5% by weight of the dried cheese prior to addition of alpha cellulose but following the quiescent period.

3. Process of claim 2 wherein milk is skim milk, the condensing step is carried out to yield 8 to 30% solids in the skim milk and drying of the coagulated milk is carried out by spray drying.

4. Process of claim 3 wherein amount of alpha cellulose is from 1 to 5%, the soft curd cheese is selected from the group consisting of baker's cheese, farmer's cheese, pot cheese, Neufchatel cheese and cottage cheese; and the starter is selected from the group consisting of diacetyl lactis, multiple strain starter containing a mixture of lactic acid forming organisms and mixtures thereof.

* * * * *